US007688708B2

(12) United States Patent
Li et al.

(10) Patent No.: US 7,688,708 B2
(45) Date of Patent: Mar. 30, 2010

(54) METHOD OF OFDMA TONE INTERFERENCE CANCELLATION

(75) Inventors: Shupeng Li, Edison, NJ (US); Sudhir Ramakrishna, New York, NY (US); Ashok N. Rudrapatna, Basking Ridge, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 920 days.

(21) Appl. No.: 11/388,638

(22) Filed: Mar. 24, 2006

(65) Prior Publication Data

US 2007/0223359 A1 Sep. 27, 2007

(51) Int. Cl.
*H04J 11/00* (2006.01)
(52) U.S. Cl. ..................................... 370/203
(58) Field of Classification Search ........................ None
See application file for complete search history.

(56) References Cited

U.S. PATENT DOCUMENTS

| 7,471,932 | B2 * | 12/2008 | Wu et al. ....................... 455/91 |
| 2007/0183516 | A1 * | 8/2007 | Monogioudis et al. ......... 375/260 |
| 2007/0195734 | A1 * | 8/2007 | Das et al. ..................... 370/335 |

FOREIGN PATENT DOCUMENTS

| EP | 1 335 518 A1 | 8/2003 |
| EP | 1 596 525 A1 | 11/2005 |
| GB | 2412045 | * 9/2005 |
| WO | WO 2005/015775 A1 | 2/2005 |

WO PCT/US2007/006097 8/2007

OTHER PUBLICATIONS

Ming et al, Hybrid OFDM-CDMA: A Comparison of MC/DS-CDMA, MC-CDMA and OFCDM, Adelaide University, 10 pages, 2002.*
Chen et al, A Programmable Architecture for OFDM-CDMA, IEEE, 7 pages, 1999.*
E. Leung et al., "A Successive Interference Cancellation Scheme for an OFDM System," IEEE International Conference on Communications, IEEE (1998), pp. 375-379.
P. Monogioudis et al , "Wireless Communications System Employing OFDMA and CDMA Techniques", (Monogioudis 30-14-38), U.S. Appl. No. 11/332,643, filed Jan. 13, 2006.
H. Sari et al., "Increasing the Capacity of CDMA Using Hybrid Spreading Sequences and Iterative Multistage Detection", IEEE VTS 50th Vehicular Technology Conference, vol. 2, Sep. 19, 1999, pp. 1160-1164.

* cited by examiner

*Primary Examiner*—Frank Duong
(74) *Attorney, Agent, or Firm*—Williams, Morgan & Amerson, P.C.

(57) ABSTRACT

An improved method is provided for reducing inter-carrier interference in the CDMA subchannels of hybrid OFDMA-CDMA systems. The results of decoding OFDMA tones are used to at least partially cancel interference from CDMA tones. Then, the CDMA tones are decoded. In specific embodiments, control information is obtained by an initial step of decoding the CDMA tones. The control information is used in decoding the OFDMA tones. Then, the decoding of the OFDMA tones and the decoding of the CDMA tones are performed iteratively, such that at least one instance of OFDMA decoding is used to cancel interference from the CDMA tones, and at least one instance of CDMA decoding is used to obtain improved control information for decoding the OFDMA tones.

5 Claims, 3 Drawing Sheets

METHOD OF OFDMA TONE INTERFERENCE CANCELLATION

FIELD OF THE INVENTION

This invention relates to wireless transmission and reception, and more particularly to transmission and reception in wireless networks using OFDMA technology.

ART BACKGROUND

Various transmission technologies are available for wireless digital communications. Among the available technologies is Orthogonal Frequency Division Multiple Access (OFDMA). In a typical OFDMA transmitter, a stream of data bits, representing voice or other payload information, is broken into a plurality of parallel data streams. Each of the parallel streams is conditioned and then modulated onto a radiofrequency (rf) subcarrier selected from a set of mutually orthogonal rf subcarriers. The modulated subcarriers are conditioned for transmission, summed, and transmitted.

The subcarriers are sometimes referred to as "tones". Accordingly, we will here refer to the conditioned signal that is ready to be modulated onto a subcarrier as a "tone input signal." Likewise, we will refer to the signal recovered in the receiver by orthogonal demodulation of a single subcarrier as a "tone output signal."

As noted above, each of the parallel streams of data bits will typically be conditioned before it is modulated onto a subcarrier. The conditioning will typically include mapping the data bits to symbols in accordance with a modulation scheme such as BPSK, QPSK, 8PSK, 32QAM, or the like. The conditioning of the input signals may also include, for example, coding designed to introduce redundancy for purposes of error correction, and coding designed to reduce the peak-to-average power ratio (PAPR) across the OFDMA system. The details of the coding of the data and the mapping of the data to symbols are collectively referred to as the "modulation and coding scheme (MCS)".

A typical OFDMA transmitter will transmit a plurality of symbols in parallel, using a plurality of subcarriers. Such a transmission will occupy a time interval which we refer to here as a "symbol interval," and will have a duration which we refer to here, without limitation, as the "packet duration". The group of symbols transmitted in parallel during one symbol interval is referred to here as an "OFDMA symbol." Further OFDMA symbols will be transmitted in subsequent symbol intervals.

In order to correctly recover the payload data from an OFDMA transmission, the receiver must have knowledge of the MCS, the packet duration, the allocation of subcarriers to tone input signals, and possibly other such information. Such information may be provided in advance, or it may be provided by signaling, for example over special channels designated for control information.

Another known technology useful for wireless digital communications is Code Division Multiple Access (CDMA) technology. In CDMA transmission, as in OFDMA transmission, an orthogonality property makes possible the parallel transmission of plural streams of input data. In CDMA, the orthogonality is provided by "spreading" the input data; i.e., by multiplying the input data in each of the various streams by a respective spreading code. The spreading code associated with each stream is orthogonal to the spreading codes associated with all of the other streams. The conditioned and spread data from a plurality of input streams may be transmitted in parallel as a composite signal over a single frequency band. At the receiver, after rf demodulation of the composite signal, the orthogonality of the spreading codes is used to demultiplex the composite signal.

A number of proposals have been made for incorporating both OFDMA technology and CDMA technology in a wireless system. For example, one such arrangement is described in the herewith commonly assigned U.S. patent application Ser. No. 11/332,643, filed on Jan. 13, 2006 by P. Monogioudis et al. under the title, "Wireless Communications System Employing OFDMA and CDMA Techniques."

Such hybrid arrangements may offer certain advantages. For example, in an OFDMA system that makes dynamic assignments of orthogonal subcarriers, the number of such dynamic assignments may be reduced by pre-allocating certain of those subcarriers for carrying CDMA transmissions.

Thus, a hybrid OFDMA-CDMA system will have at least one frequency subchannel designated for carrying the CDMA transmissions. Such a subchannel may comprise as little as one subcarrier. More often, however, a CDMA subchannel will comprise a plurality of subcarriers. These subcarriers may be separated and discrete, or they may be contiguous. If they are contiguous, they may span a continuous band of frequency which we refer to as a "CDMA zone."

The CDMA subcarriers may be used, e.g., to transport control information, or low-rate user data, or both, as well as other types of information.

OFDMA systems are known to be susceptible to inter-carrier interference. For example, imperfect orthogonality among the subcarriers may cause signals transmitted from different users on the reverse link, or uplink, of an OFDMA system to interfere at the base station receiver. When the various subcarriers are received with similar power levels, the inter-carrier interference is generally comparable to, or even less than, the thermal noise in the receiver. Under such circumstances, the inter-carrier interference can generally be neglected.

However, when the number of users on a CDMA subchannel of a hybrid system is small, the received power on the CDMA subcarriers may be significantly weaker than the received power on the neighboring OFDMA subcarriers. In such a case, the inter-carrier interference may no longer be negligible. For example, some studies have predicted levels of inter-carrier interference as high as −5 dB, which is much higher than typical levels of thermal noise. (It should be noted that other factors, such as imperfect estimation of frequency offsets, may aggravate the inter-carrier interference.) When inter-carrier interference reaches significant levels, one undesirable consequence is that the power-control loop may be affected. That is, the power-control loop may seek to improve reception at the base station by boosting the transmit power of the users. However, as power is increased on the reverse-link CDMA subchannels, intercell interference may also increase on these channels. The overall consequence may be reduced system capacity in the wireless network.

Thus, there remains a need for improved methods of reducing inter-carrier interference in the CDMA subchannels of hybrid OFDMA-CDMA systems.

SUMMARY OF THE INVENTION

We have found an improved method for reducing inter-carrier interference in the CDMA subchannels of hybrid OFDMA-CDMA systems. According to our method, the OFDMA tones are decoded. Then, the results of decoding the OFDMA tones are used to at least partially cancel interference from the CDMA tones. Then, the CDMA tones are decoded.

In specific embodiments of our method, control information is obtained by an initial step of decoding the CDMA tones. The control information is used in decoding the OFDMA tones. Then, the decoding of the OFDMA tones and the decoding of the CDMA tones are performed iteratively, such that at least one instance of OFDMA decoding is used to cancel interference from the CDMA tones, and at least one instance of CDMA decoding is used to obtain improved control information for decoding the OFDMA tones.

DETAILED DESCRIPTION

For purposes of illustration, the invention will be described here in the context of reverse link (also referred to as "uplink") communication from the users to the base station. However, the principles to be described here are more general in application, and may also be useful, for example, in the context of forward-link communications, and even in the context of peer-to-peer communications.

Figure 1:
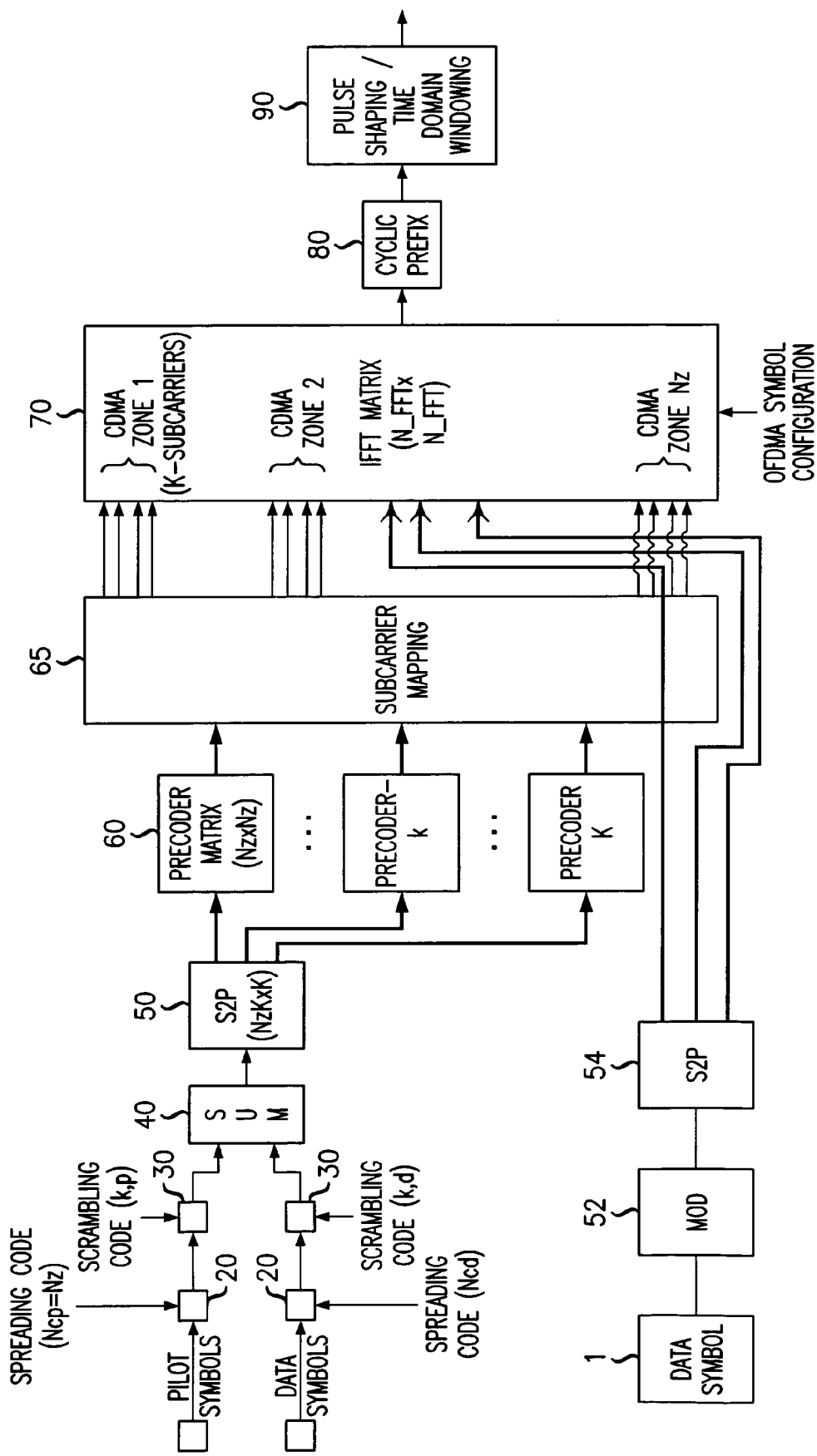
FIG. 1 is a simplified, functional block diagram of the signal-processing portions of an OFDMA transmitter adapted for transmitting a plurality of CDMA signals.

One example of a hybrid transmitter is illustrated in FIG. 1. The streams of initial data represented by blocks 10 of the figure are destined to be transmitted on the CDMA subchannel. Pilot symbols 12 may also be transmitted on the CDMA subchannel. To condition the data for transmission, each input stream of data or pilot symbols is multiplied by its own spreading code, as indicated at blocks 20. It is also well-known in CDMA technology to multiply the input signal by a scrambling code, as indicated by blocks 30. The scrambling code is useful for purposes of security, and also for identifying the serving sector for users in different cells.

The various input streams are added together at block 40 to form a composite input stream. At serial-to-parallel converter 50, the composite input stream is demultiplexed into substreams to be processed in parallel, according to well-known methods. At precoder block 60, the parallel input substreams, which represent time-domain signals, are subjected to, e.g., a discrete Fourier transform (DFT) algorithm which converts them to a frequency-domain output signal. Accordingly, each output port of block 60 will correspond to a discrete frequency. The frequency correspondence will be determined by the mapping at block 65 which is described below.

Those skilled in the art will recognize that at precoder block 60, a DFT matrix or an identity matrix may be applied to the input substreams in such a way as to reduce the peak-to-average power ratio (PAPR) of the transmitted signal.

Over the duration of one symbol interval, a respective, complex scalar value will appear at each of these output ports. The output values from precoder 60 are fed as input to block 65, where, as noted above, they are mapped to respective OFDMA subcarriers. The output of block 65 constitutes an OFDMA symbol.

Each resulting OFDM symbol is applied to the input ports of IFFT (inverse fast Fourier transform) block 70, where it is placed on the subcarriers constituting the CDMA subchannel according to well-known OFDMA techniques. At block 80, a cyclic prefix is added to the resulting signal, according to well-known OFDMA techniques. Prior to transmission, the signal may be subjected to signal-processing block 90, where, e.g., a pulse-shaping filter or windowing function is applied to remove undesired high-frequency components from the signal.

The streams of initial data represented by blocks such as block 14 are destined to be transmitted on subcarriers designated for, e.g., conventional OFDMA transmission. According to well-known OFDMA methods, the data originating at block 14 are mapped to symbols at block 52 using a suitable modulation scheme, converted from a serial data stream to multiple, parallel data streams at serial-to-parallel converter 54, and then fed as input to IFFT block 70. Subsequent processing is as described above.

Figure 2:
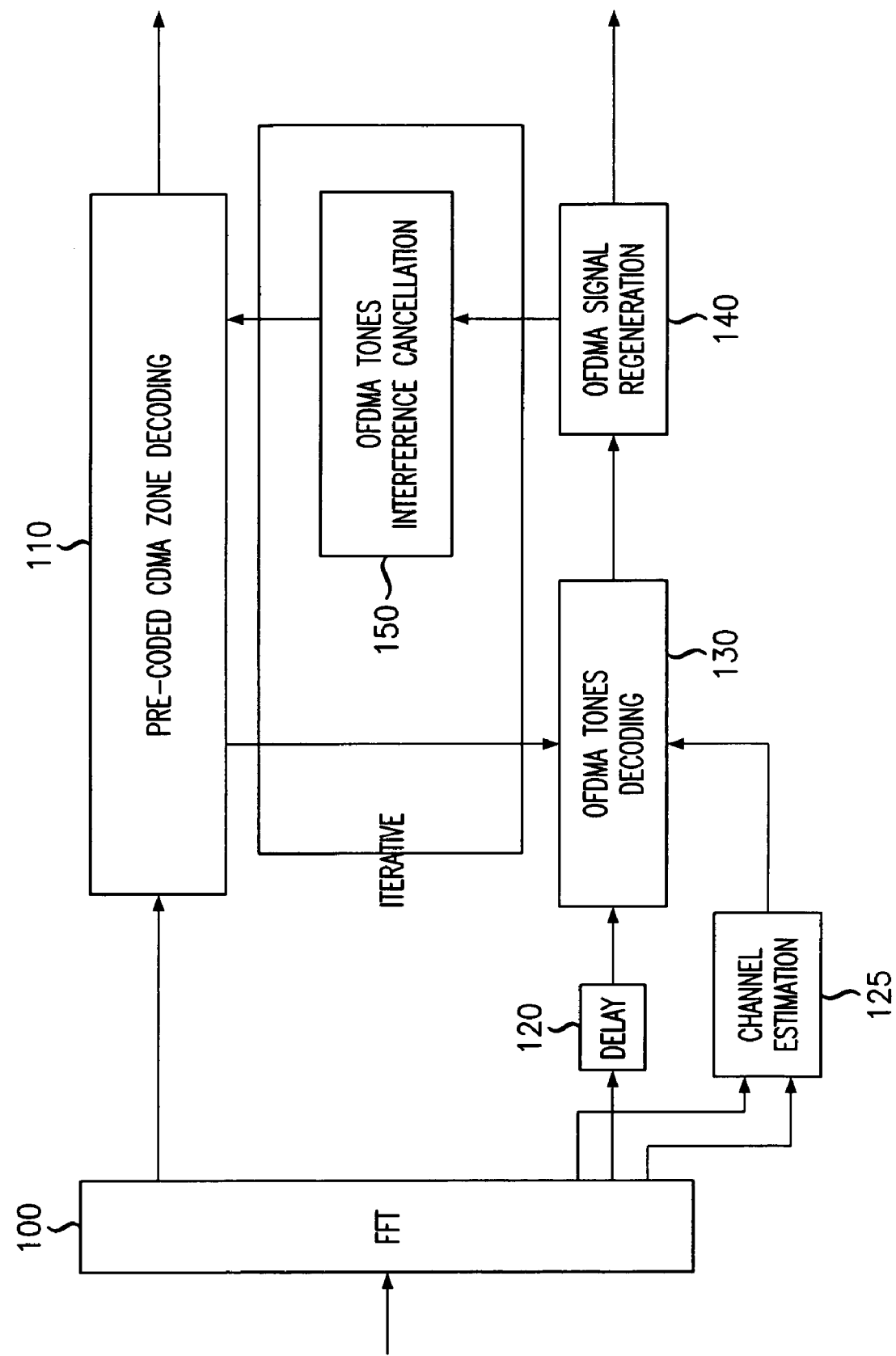
FIG. 2 is a simplified, functional block diagram of the signal-processing portions of a receiver in a hybrid OFDMA-CDMA system according to the invention in one embodiment.

Reference is now made to FIG. 2, which illustrates a receiver which might, for example, be used in a base station of a hybrid OFDMA-CDMA system. The receiver of FIG. 2 is particularly useful in systems that use a pre-allocated CDMA subchannel for communicating control information needed for successful recovery of the payload data from OFDMA transmissions. As noted above, such control information may include, among other things, the MCS, the packet duration, and the allocation of subcarriers to tone input signals.

At block 100, the signal received over the air interface is processed by an FFT (fast Fourier transform) algorithm to recover individual tone output signals. At block 110, the tone output signals that fall within the CDMA subchannel are decoded using well-known techniques of CDMA reception. The processing represented by block 110 will include the inverse of the precoding process as represented, e.g., by block 60 of FIG. 1. Such processing will typically include an inverse DFT to convert from a frequency-domain signal to a time-domain signal.

Among other things, the decoding in block 110 provides the control information needed for decoding the OFDMA tone output signals. However, the control information initially obtained from block 110 may be corrupted by inter-carrier interference, as explained above. Therefore, as will be seen below, the control information will be used initially only to provide an approximation of decoded OFDMA tone output signals, to be used for cancelling interference from the CDMA tone output signals.

Accordingly, delay circuit 120 assures that the initial approximation of the control information is available from block 110 before an attempt is made to decode the OFDMA tone output signals. At block 130, the OFDMA tone output signals are decoded, using the current version of the control information and using estimates of the channel coefficients computed at block 125. Various channel-estimation methods are well known, including, e.g., methods based on the measurement of pilot signals.

As the number of iterations increases, the control information will generally increase in accuracy. It should also be noted that control information may be transmitted on the CDMA subchannel at a relatively high power, as compared, e.g., to low-rate data also sent on the CDMA subchannel. Boosting the transmit power of the control information tends to reduce the error rate of the received control information, and thus to reduce the likelihood of a decoding failure at block 130.

Blocks 140 and 150 represent a process for cancelling inter-carrier interference (ICI) from the CDMA signals. Algorithms for carrying out such a process are well-known and need not be described here in detail. Typically, a parallel ICI-cancelling algorithm will be used.

Very briefly, the interference-cancellation process attempts first to regenerate the OFDMA tone output signals as they would be if there were no crosstalk from the CDMA tone output signals. Excluding such crosstalk is important in order for the cancellation process to be stable. Estimated ICI signals are computed from the regenerated OFDMA tone output signals, and then they are subtracted from the CDMA tone output signals.

Thus, at block 140, regenerated OFDMA tone output signals are computed using data recovered at block 130 by decoding the OFDMA tone output signals, and using control data obtained from block 110.

At block 150, estimated ICI signals are computed using the regenerated signals from block 140 and the channel estimates obtained at block 125, including channel estimates for the CDMA subcarriers. Further at block 150, the estimated ICI is cancelled from the CDMA tone output signals. It should be noted in this regard that the ICI is cancelled from the CDMA signals as obtained directly from the output of FFT block 100; that is, prior to the processing represented by block 110.

At block 110, the interference-canceled CDMA signals are decoded, as described above, to recover the payload bits transmitted on the CDMA tones. Control information obtained from the CDMA signals is sent to OFDMA decoder block 130, control may be returned to block 130, and a further iteration of the above steps may be performed.

In operation, both the quality of the recovered control information and the quality of the decoded OFDMA tone output signals will tend to improve with succeeding iterations. As a consequence, the calculated interference will converge toward the actual interference, and the resulting interference cancellation will become more and more effective, at least until some limit is reached.

The iterations cease when a suitable criterion is satisfied. One example of a suitable criterion would be to stop after a fixed number of iterations. We believe that in typical networks, as few as three or four iterations will often be sufficient. Another example of a suitable criterion would be to stop after a fixed number of iterations, or to stop even sooner if the incremental improvement in the output signal over the result of the previous iteration is less than a specified amount.

When the iterations cease, the final version of the decoded CDMA signals is provided by block 110, and the final version of the decoded OFDMA signals is provided by block 130. The final version of the interference-cancelled CDMA signals as presented at the input of the IFFT module may also be provided.

In some hybrid OFDMA-CDMA systems, the base station receiver will have advance knowledge of the control information needed for signal recovery. As noted, this information may include the MCS, the packet duration, and the tone allocations. This information may be provided in advance if, for example, the user which is transmitting to the base station is operating in so-called "schedule mode." Under such circumstances, the base station receiver may operate according to the simpler process illustrated in FIG. 3, instead of the iterative process of FIG. 2. Certain of the processing elements shown in FIG. 2 have been repeated in FIG. 3, and are designated in both figures by the same reference numerals.

Figure 3:
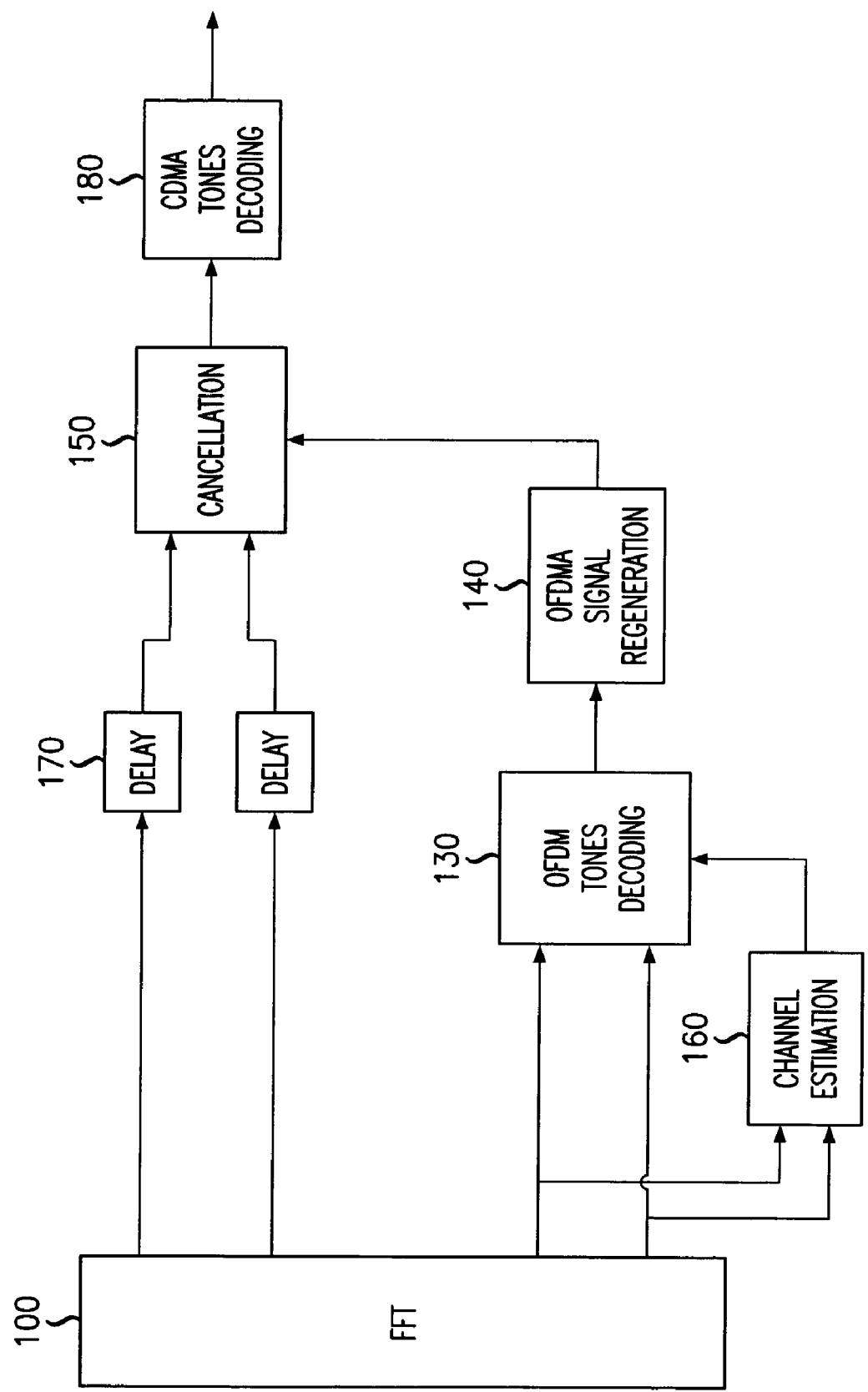
FIG. 3 is a simplified, functional block diagram of the signal-processing portions of a receiver in a hybrid OFDMA-CDMA system according to the invention in a further embodiment.

Turning now to FIG. 3, it will be seen that as in the previous figure, signals received from the air interface are subjected to FFT process 100. The OFDMA tone output signals obtained from FFT block 100 are decoded at block 130. Decoder 130 uses estimates of the channel coefficients for the OFDMA tones that are provided at block 160. At block 140, the OFDMA tone output signals are regenerated as described above in reference to the receiver of FIG. 2.

Turning to the upper portion of FIG. 3, it will be seen that the CDMA tone output signals are processed after the delay indicated by blocks 170, which allows time for the interfering OFDMA signals to be regenerated as described above. At block 150, the interference is calculated from the regenerated signals, and is subtracted from the CDMA tone output signals to produce interference-cancelled signals. As explained above in reference to the receiver of FIG. 2, the interference is subtracted from the CDMA signals before they are subjected to CDMA decoding. CDMA decoder block 180 corresponds to block 110 of FIG. 2.

We now briefly describe one well-known method for cancelling the ICI from a symbol which is to be detected. The method is described for purposes of illustration, and is not meant to be limiting. According to such method, it is possible to model ICI as additive interferences.

By way of further illustration, a model OFDMA system uses an N-point IFFT algorithm to place symbols onto subcarriers and transmits the symbols with a symbol interval T over a Rayleigh fading channel having M dispersive paths. The channel has fading coefficients $H_m(n-l)$, in which m denotes a dispersive path, n is the index of an interfering sub-carrier, and l is the index of a sub-carrier on which a symbol is received. The ICI contribution due to symbol $a_n$ on subcarrier n is computed as:

$$\sum_{m=0}^{M-1} a_n H_m(n-l) \exp\left(-j\frac{2\pi nm}{N}\right),$$

with the summation taken over the dispersive paths. The total ICI contribution from all OFDMA tones to one particular CDMA tone l is:

$$\sum_{n=all\ ofdma\ zones} \sum_{m=0}^{M-1} a_n H_m(n-l) \exp\left(-j\frac{2\pi nm}{N}\right)$$

wherein, $$H_m(n-l) = \frac{1}{N}\sum_{k=0}^{N} h_m \exp\left(j\frac{2\pi k(n-l)}{N}\right),$$

$h_m$ is the channel estimation result in block 125, and $a_n$ is the OFDMA tones decoding result from block 130. Based on these values, we can calculate the ICI contribution on each CDMA tone and then subtract these contributions from the original output from block 100 into block 110 to thereby carry out a typical interference-cancellation process.

ICI cancellation of the kind discussed above is described, e.g., in E. Leung et al., "A Successive Interference Cancellation Scheme for an OFDM system," IEEE International Conference on Communications, IEEE (1998), 375-379.

What is claimed is:
1. A method, comprising:
radiofrequency-demodulating a wireless transmission from a group of two or more orthogonal frequency division multiple access (OFDMA) subcarriers, thereby to obtain at least two concurrent signals, denominated tone output signals, sent by an entity in a wireless network;
OFDMA-decoding at least one of the tone output signals;

using a result of the OFDMA-decoding to generate at least one interference signal;
canceling said at least one interference signal from at least one further tone output signal, thereby to produce at least one interference-canceled signal; and
code division multiple access (CDMA)-decoding said at least one interference-canceled signal.

2. The method of claim 1, further comprising:
in an initial CDMA-decoding step that precedes the OFDMA-decoding, CDMA-decoding at least one tone output signal, thereby to obtain control information; and
using the control information in the OFDM-decoding.

3. The method of claim 2, wherein:
the OFDMA-decoding, the interference-signal generation, the interference-cancellation, and the CDMA-decoding of an interference-canceled signal take place in a cycle which is repeated at least once; and
in each repeated cycle, the OFDMA-decoding uses control information obtained in the preceding cycle from the CDMA-decoding of at least one interference-canceled signal.

4. The method of claim 2, wherein the control information comprises at least one of: a modulation and coding scheme, a packet duration, and an allocation of subcarriers to signals to be transmitted by said entity.

5. The method of claim 1, wherein the CDMA-decoding is carried out so as to recover information comprising control information and low-rate user data.

* * * * *